United States Patent
Gracin

(10) Patent No.: US 8,640,127 B2
(45) Date of Patent: Jan. 28, 2014

(54) RELOCATING GUEST MACHINE USING PROXY TOOL HAVING MULTIPLE VIRTUAL MACHINES WHERE ONE VIRTUAL MACHINES PROVIDES HOST ROUTE FOR RELOCATION

(75) Inventor: Stephen P. Gracin, Binghamton, NY (US)

(73) Assignee: International Business Machines Corporation, Armonk, NY (US)

(*) Notice: Subject to any disclaimer, the term of this patent is extended or adjusted under 35 U.S.C. 154(b) by 423 days.

(21) Appl. No.: 12/886,643

(22) Filed: Sep. 21, 2010

(65) Prior Publication Data

US 2012/0072907 A1    Mar. 22, 2012

(51) Int. Cl.
*G06F 9/455* (2006.01)
*G06F 15/16* (2006.01)

(52) U.S. Cl.
USPC ................................ 718/1; 709/229; 709/227

(58) Field of Classification Search
None
See application file for complete search history.

(56) References Cited

U.S. PATENT DOCUMENTS

| | | | |
|---|---|---|---|
| 6,775,235 B2 | 8/2004 | Datta et al. | |
| 7,406,048 B2 | 7/2008 | Datta et al. | |
| 7,609,619 B2 | 10/2009 | Naseh et al. | |
| 7,630,341 B2 | 12/2009 | Buddhikot et al. | |
| 7,710,865 B2 | 5/2010 | Naseh et al. | |
| 8,274,912 B2 * | 9/2012 | Wray et al. | 370/254 |
| 2008/0163207 A1 * | 7/2008 | Reumann et al. | 718/1 |

FOREIGN PATENT DOCUMENTS

| | | |
|---|---|---|
| EP | 2015511 A1 | 1/2009 |
| EP | 2028592 A1 | 2/2009 |

OTHER PUBLICATIONS

Amrehn et al; Linux on IBM zSeries and S/390: High Availability for z/VM and Linux, IBM Redbooks Paper, 2002.*
IBM; TCP/IP Level 430 Planning and Customization, SC24-6019-01, 2002.*
Wunder et al; z/VM VSWITCH with failover; IBM Corp., 2004.*
AT&T, "Relocating or Migrating the Data Center: Managing the Transition to Internet-Based Hosting", "How To" Series, Dec. 13, 2005, 4 pages.
US 7,525,906, 04/2009, Naseh et al. (withdrawn)

* cited by examiner

*Primary Examiner* — Jennifer To
*Assistant Examiner* — Bing Zhao
(74) *Attorney, Agent, or Firm* — Andrea Bauer; Hoffman Warnick LLC

(57) ABSTRACT

A system tool, method and program product for relocating an original guest from a first host to a second host in a z/VM environment. A method is disclosed that includes: bringing the original guest down at the first host, wherein the original guest includes a predetermined virtual internet protocol address (VIPA); bringing up a new guest at the second host, wherein the new guest has the predetermined VIPA; autologging on a first virtual machine (VM) at the second host that provides a VM TCP/IP stack to an interface with a virtual switch; launching a second VM to provides a VM multiprotocol server configured for OSPF to run with the VM TCP/IP stack to generate a host route for the new guest, wherein the second VM is launched by the first VM; and launching a third VM for determining a status of the virtual switch and advertising to the network a host route of the new guest, wherein the third VM is launched by the first VM.

20 Claims, 4 Drawing Sheets

RELOCATING GUEST MACHINE USING PROXY TOOL HAVING MULTIPLE VIRTUAL MACHINES WHERE ONE VIRTUAL MACHINES PROVIDES HOST ROUTE FOR RELOCATION

BACKGROUND

The present invention relates to relocating virtual machine (VM) hosts in a disaster recovery situation and more particularly to utilizing a virtual machine proxy tool to facilitate relocating hosts with a computer network.

In a disaster recovery situation it becomes necessary to move a data processing function to another physical site within the network. Typically this is accomplished by moving a "host" (i.e., a computer on which one or more "guest" computers are emulated) with a fixed IP address to a different IP subnetwork, and then advertising to the network infrastructure the host's new location.

This can for example be done by providing each host a Virtual IP Address (VIPA), and then having each individual host advertise the route to its VIPA. However, this requires each host to have a routing daemon that must be installed, tailored and maintained for perhaps hundreds of guests.

BRIEF SUMMARY

The present invention provides a solution for relocating data processing functions within a network using a virtual machine (VM) proxy tool. According to one embodiment of the present invention, there is provided a system tool that runs on a z/VM host for automating the processing of a new guest, comprising: a first virtual machine (VM) that is auto-logged and is a VM TCP/IP stack that provides an interface to a virtual switch; a second VM that provides a VM multiprotocol server configured for OSPF to run with the VM TCP/IP stack to generate a host route for the new guest, wherein the second guest is launched by the first VM; and a third VM for determining a status of the virtual switch and advertising to the network a host route of the new guest, wherein the third VM is launched by the first VM.

According to another aspect, there is a method for relocating an original guest from a first host to a second host in a z/VM environment, comprising: bringing the original guest down at the first host, wherein the original guest includes a predetermined virtual internet protocol address (VIPA); bringing up a new guest at the second host, wherein the new guest has the predetermined VIPA; autologging on a first virtual machine (VM) at the second host that provides a VM TCP/IP stack to an interface with a virtual switch; launching a second VM to provides a VM multiprotocol server configured for OSPF to run with the VM TCP/IP stack to generate a host route for the new guest, wherein the second VM is launched by the first VM; and launching a third VM for determining a status of the virtual switch and advertising to the network a host route of the new guest, wherein the third VM is launched by the first VM.

According to another aspect, there is a computer program product for automating the processing of a new guest at a host in a virtual machine (VM) environment, the computer program product comprising: a computer readable storage medium having computer readable program code embodied therewith, the computer readable program code comprising: program code for autologging on a first VM at the host that provides a VM TCP/IP stack to an interface with a virtual switch; program code for launching a second VM to provide a VM multiprotocol server configured for OSPF to run with the VM TCP/IP stack to generate a host route for the new guest, wherein the second VM is launched by the first VM; and program code for launching a third VM for determining a status of the virtual switch and advertising to the network a host route of the new guest, wherein the third VM is launched by the first VM.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings.

Figure 1:
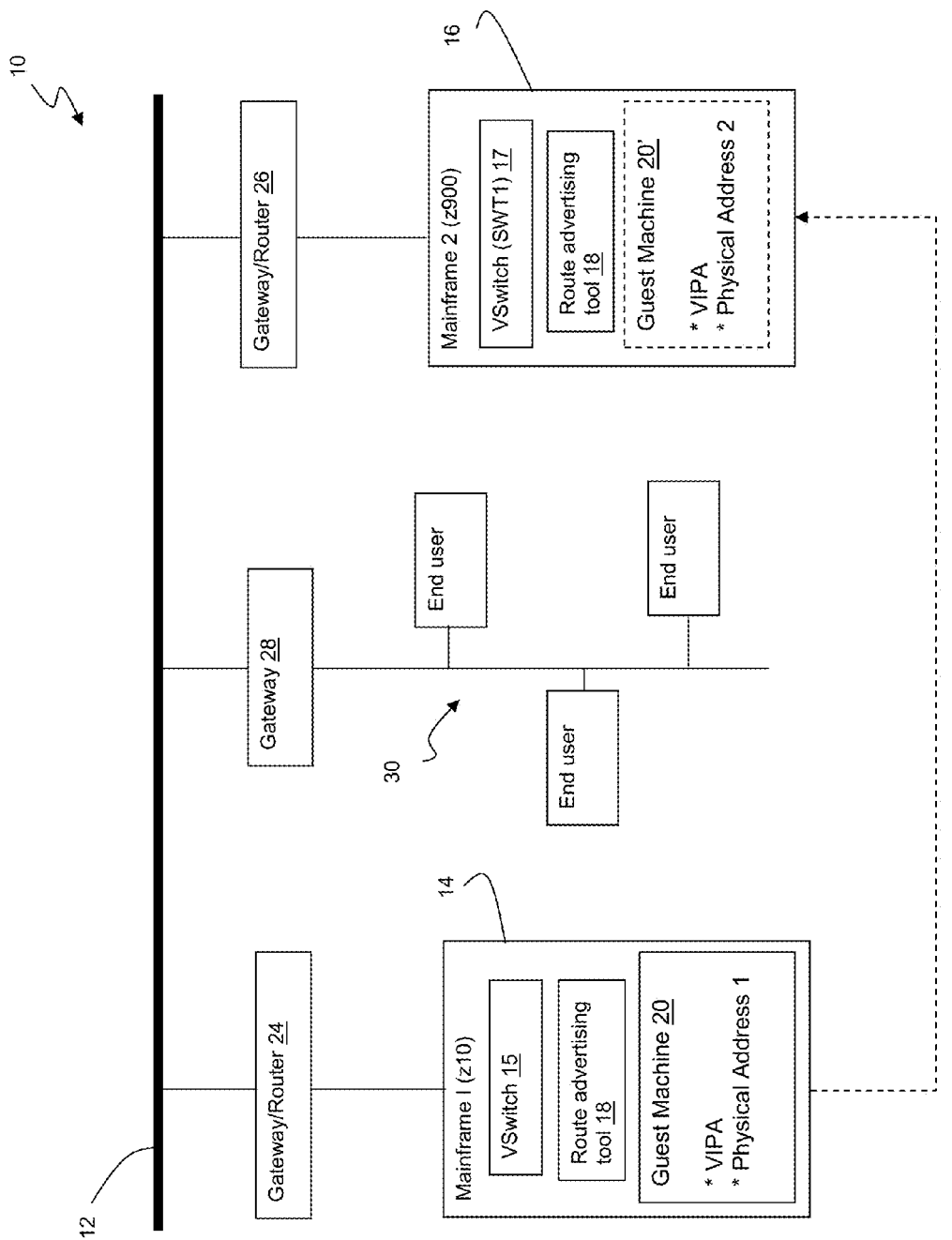
FIG. 1 depicts a network in which a guest is relocated to a new host in accordance with an embodiment of the invention.

The drawings are merely schematic representations, not intended to portray specific parameters of the invention. The drawings are intended to depict only typical embodiments of the invention, and therefore should not be considered as limiting the scope of the invention. In the drawings, like reference numbering represents like elements.

DETAILED DESCRIPTION

Virtual machine operating systems, such as IBM's z/VM may include various tools to, e.g., implement routing protocols. In particular, z/VM includes an OSPF (Open Shortest Path First) Proxy Tool, which is utilized herein to provide for the relocation of a guest to a new host, e.g., disaster recovery. What is pertinent to the z/VM OSPF Proxy Tool for disaster recovery is that it includes a facility, namely the z/VM MPROUTE Server, which can be used to advertise OSPF HOST routes on behalf of guest machines connected to the physical network through a z/VM Virtual Switch technology. The guest hosts do not send an OSPF advertisement themselves; the z/VM OSPF Proxy Tool does this for them eliminating setup in each guest.

This way, host routes for a guest are generated and advertised by the z/VM TCP/IP and MPROUTE Server, and no guest traffic flows through the z/VM TCP/IP stack. Instead, the guest traffic and OSPF advertisements flow in parallel through the VSwitch. This maintains the efficiency of using the VSwitch architecture, removing the need to run a routing daemon in each guest. This thus eliminates package installation and tailoring in every guest, conserving virtual memory and processor resources, while providing the OSPF routes that make relocating guests simple.

Guests are configured with a virtual internet protocol address (VIPA) that remains constant when a guest is relocated to a different IP network within an enterprise. This is accomplished by implementing a controlling OSPF Proxy Tool virtual machine to: (1) monitor which guests on a particular VSwitch have a coupled virtual NIC, and (2) which coupled network interface cards (NICs) are under control of an active IP stack. If the NIC is controlled by an active stack, a configuration file is referenced to see if a host route should be built and advertised on behalf of a Linux guest.

Note that while the illustrative embodiments are described herein with reference to a z/VM operating system architecture, the invention could be analogously implemented in other VM operating systems that have similar facilities.

FIG. 1 depicts an illustrative network 10 that includes the guest machine relocation capabilities. In this example, a first mainframe computer 14 (a z10) and a second mainframe computer 16 (a z900) both running the z/VM operating system are shown. An end user network 30 has access to both mainframes 14, 16 via a gateway 28, backbone 12, gateway/routers 24, 26, and VSwitches 15, 17. End user network 30 may for example comprise bank teller workstations that interact with bank services provided by the mainframe computers 14, 16. In this scenario, a guest machine 20 is currently running on the first mainframe computer 14, and has an associated Virtual IP Address (VIPA) and physical address. For some reason (either planned or unplanned), the guest machine 20 needs to be relocated to the second mainframe computer 16, i.e., as guest machine 20'. In order to effectuate this process in an automated fashion, a route advertising tool 18 is implemented. Route advertising tool 18 will essentially automatically advertise the VIPA at the second mainframe 16, without the need to run additional daemons, as described above.

Figure 2:
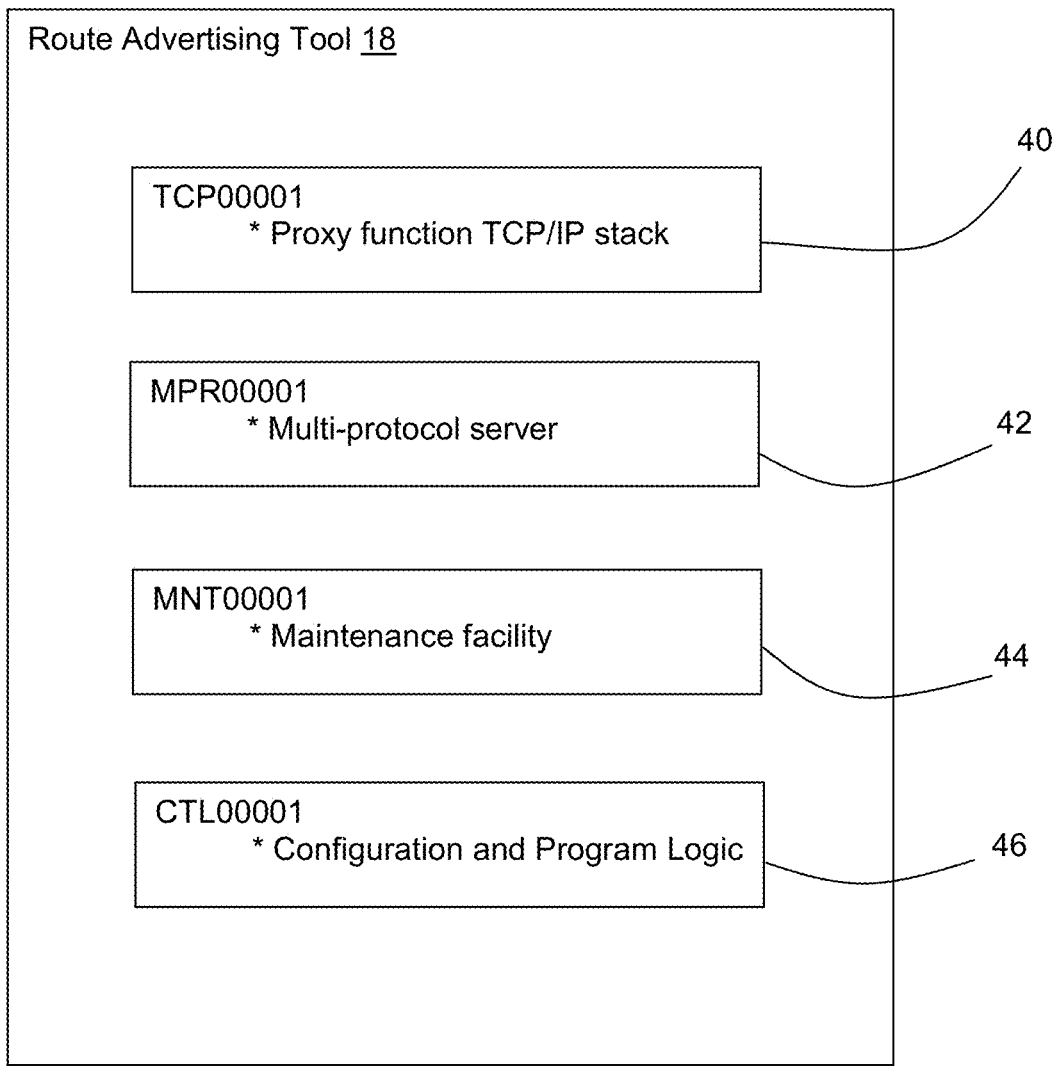
FIG. 2 depicts a route advertising tool in accordance with an embodiment of the invention.
Figure 4:
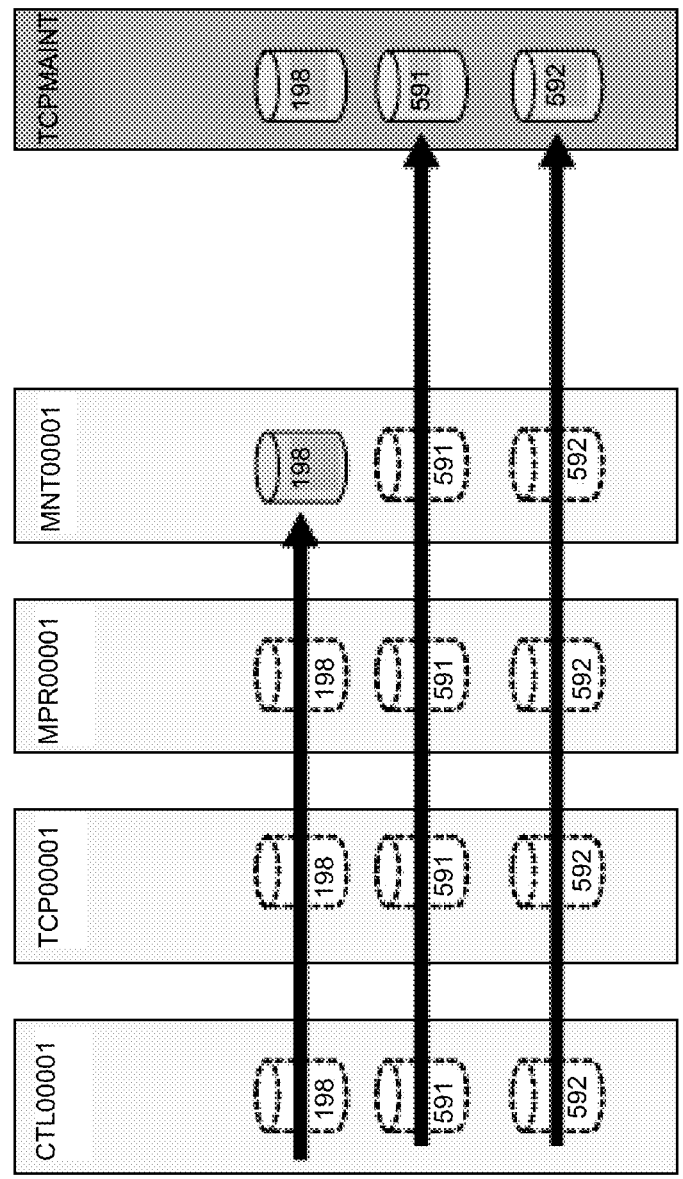
FIG. 4 depicts z/VM proxy guest disks in accordance with an embodiment of the invention.

FIG. 2 depicts route advertising tool 18 in further detail. In particular, route advertising tool 18 is implemented as four z/VM guest machines, 40, 42, 44, 46, to support the building and advertising of proxy OSPF host routes for guests using a particular Vswitch. Four z/VM user IDs, TCP00001, MPR00001, and MNT00001 and CTL00001 are utilized, which parallel the names of the proxy functions provided by z/VM. The first three user ids provide the z/VM functions of TCPIP, MPROUTE, and TCPMAINT respectively. The fourth user id, CTL00001, is where configuration data and the program logic reside. FIG. 4 depicts an illustrative implementation of z/VM proxy guest disks.

TCP00001 is the z/VM TCP/IP stack for the Proxy function. Its goal to provide the IP service required to interface with the one NIC on Vswitch SWT1. There is only one set of DEVICE and LINK statements in its profile, and this stack does not provide any other functions such as TN3270, as all sockets are disabled. This machine has a HOME address of 192.168.0.253, and there is no DEFAULT GATEWAY specified and the stack will learn routes from its OSPF Neighbor, ROUTER2Z2.

MPR00001 is the z/VM Multi-protocol Server configured for OSPF to run with stack TCP00001.

MNT00001 is the equivalent of the shipped z/VM machine TCPMAINT. Configuration files such as TCP00001 TCPIP, MPROUTE CONFIG, HOST CONTROL, SYSTEM DTC-PARMS are stored and maintained on its 198 'D' disk.

CTL00001's 191 'A' disk is where the executables SWTQA EXEC, DSUB20 MODULE, and DSUB24 MODULE reside. This userid is autologged on by an EXIT named in SYSTEM DTCPARMS; this EXIT is called by TCP00001. When CTL00001 is logged on it automatically starts SWTQA EXEC. SWTQA runs continuously in this fourth user, first calling a program DSUB20 that queries which Linux guests have a virtual NIC defined to the Vswitch, and then calls DSUB24 to check if the guests' NIC is not only defined, but active with an IP stack.

If the Guest has a virtual NIC that is defined and active, a HOST route is built based upon information in a HOST CONTROL file. The route is added to a z/VM TCPIP OBEY file which will be used to update the TCP00001 stack. When the OBEYFILE command is issued the TCP00001 GATEWAY statements are updated, in turn MPR00001 will advertise these HOST routes.

In this configuration, one controlling stack is used per Vswitch and per VLAN. However, with proper configuration, any number of Vswitches can use the OSPF Proxy function.

Figure 3:
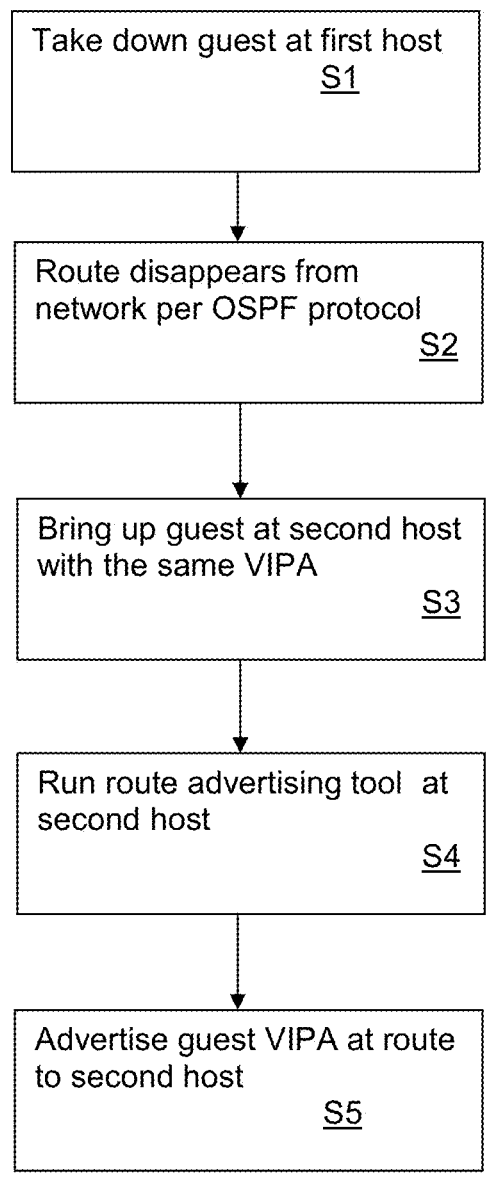
FIG. 3 depicts a flow chart showing a method of an illustrative embodiment of the invention.

FIG. 3 depicts a flow chart showing an illustrative methodology. At 51, a guest is taken down at the first host. At S2, the route for the guest disappears from the network per OSPF protocol standards. At S3, a second instance of the guest is brought up at the second host with the same VIPA. At S4, the route advertising tool is run, and at S5, the guest VIPA is advertised with a route to the second host.

The guest machine start-up sequence at the second host may be implemented as follows. The VSWITCH SWT1 (FIG. 1) is defined and GRANTs are issue in the PROFILE EXEC of user AUTOLOG1, and the user TCP00001 is logged on by this EXEC. TCP00001 initializes reading its configuration file TCP00001 TCPIP from the 198 disk of user MNT00001 it has accessed. While TCP00001 is initializing due to a statement in its configuration file, it will cause MPR00001 to be logged on. MPR00001 will initialize by reading its configuration file MPROUTE CONFIG from the 198 disk of MNT00001.

To complete initialization, TCP00001 runs an EXIT program AUTOCTL EXEC also on the 198 disk of MNT00001, which will logon CTL00001. At this point TCP00001, MPR00001, and CTL00001 have be logged on. CTL00001 starts SWTQA EXEC which runs continuously.

In user CTL00001, Rexx Exec SWTQA EXEC runs as follows:

1. It waits a DELAY period, a pre-determined number of seconds then calls the DSUB20 MODULE with the Vswitch name SWT1. DSUB20 MODULE uses the Vswitch name when it issues a DIAGNOCSE 26C subcode x'20'. The returned data is parsed for conditions such as the Vswitch has been detached, no guests have a NIC, or if there are guests with NICs. Information is placed in the CMS Stack and DSUB20 MODULE exits.

2. SWTQA inspects the stacked information, if there are no guests with NICs, return to Step 1. If there are users with NICs, SWTQA saves these guest names.

3. SWTQA has saved the user names from the CMS Stack, any guest names returned have a NIC but their stack may not be active. They may have been just logged on, or shutdown but not logged off, routing information will only be built for an active guest.

4. SWTQA calls DSUB24 MODULE passing to it a guest name and Vswitch name. The DSUB24 MODULE issues a DIAGNOSE 26C subcode x'24' with the Guest name and a Vswitch name. Guests can have NICs in multiple Vswitches and SWTQA EXEC requires a response for a specific Vswitch. Information found for the target guest name and Vswitch name is placed in the CMS Stack and DSUB24 MODULE exits.

5. SWTQA inspects the stacked information. If the guests' NIC comes back flagged as active, then SWTQA will check file HOST CONTROL to see if the guest is eligible for a host route. If it is, a host route is added to a file HOST ROUTES on its 191 'A" disk. When all guests have been processed, an OBEYFILE command is issue to place the routes in file HOST ROUTES into effect. Return to Step 1.

An important association is the 198 'D' disk that CTL00001 accesses. This controls what z/VM TCP/IP Stack is discovered by the SWTQA EXEC. All other required information is gathered based upon this discovery being correct.

Note that a z900 processor can only support a Layer3 VSWITCH, so for instance, the Linux guests can be defined with a virtual NIC to Vswitch SWT1 and setup to use the dummy0 interface and a vipa configuration. The guests are configured to use a virtual IP address. This can be implemented by configuring interface dummy0 and using qethconf to enable the NIC to accept this virtual IP address. The following script from directory /etc/rc.d of guest LINLAB1 is used to setup the address for dummy0 and associate it to interface eth1.

\*\*\*\*\*

```
#!/bin/bash
ifconfig dummy0 10.1.1.2 netmask 255.255.255.255 mtu 1492 up
route add -net 10.1.1.0 netmask 255.255.255.0 dev eth1
qethconf vipa add 10.1.1.2 eth1
```

\*\*\*\*

Once the script is built and added to startup, its execution can be turned on/off and checked with the chkconfig command.

```
linlab1~# chkconfig setup4proxy
setup4proxy on
Linlab 1~#
```

Other guests use the same configuration method, only the IP addresses are changed.

Note also that there may be no way for the Vswitch logic to know which IP address is the Home address and which one is the VIPA. A configuration file may be used to associate real and virtual IP address. This file is referenced by the SWTQA EXEC. The required format is Guest Machine name, followed by VIPA address, then the NIC IP address separated by one or more blanks. An illustrative HOST CONTROL file from the 198 'D' minidisk of user MNT00001 is as follows, wherein LINLAB1 . . . LINLAB4 are guest machine names.

```
00000 * * * Top of File * * *
00001 ALL_NAMES_MUST_BE_UPPER_CASE
00002 GUEST_NAME___VIPA_____NIC_IP_ADDR
00003 LINLAB1 10.1.1.1 192.168.9.1
00004 LINLAB2 10.1.1.2 192.168.9.2
00005 LINLAB3 10.1.1.3 192.168.9.3
00006 LINLAB4 10.1.1.4 192.168.9.4
00007 * * * End of File * * *
```

As the Proxy function runs, it gathers information for a particular Vswitch, in this case SWT1. To find which guests' have a NIC, a determination of which of these NICs have been started by an IP stack is made. For example, if it is found that LINLAB1 has a NIC defined to Vswitch SWT1 but the NIC is not active, this means user LINLAB1 is logged on but the Linux operating system is down for some reason. No HOST route is built. If it is found that LINLAB1 has a NIC with an active stack, a HOST route will be built whose rule will be to get to vipa 10.1.1.1 route to 192.168.9.1. There is no limit to the number of guests that can be defined in a HOST CONTROL file.

Accordingly, using the z/VM Proxy Tool with virtual IP addresses allows hosts with specific data processing functions to be moved within a network and have the routing adjust itself to the new location. This only requires that a guest machine have a VIPA defined which is a common function. No Dynamic Routing Daemons or other software must be added to a guest machine. Instead, the OSPF Proxy tool will control routes based upon status discovered within the Vswitch.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including Instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
    at least one computing device having a hardware processor, the at least one computing device including a tool that runs on a z/VM host for automating the processing of a new guest, the tool including:
        a first virtual machine (VM) that autologs onto the z/VM host, the first VM being configured to act as a VM Transmission Control Protocol/Internet Protocol (TCP/IP) stack that provides an interface between the new guest and a virtual switch;
        a second VM that provides a VM multiprotocol server configured for OSPF (Open Shortest Path First) to run with the VM TCP/IP stack to generate a host route for the new guest, wherein the second VM is launched by the first VM; and
        a third VM configured to monitor whether the new guest is coupled to a virtual network interface card (NIC), and to monitor whether the virtual NIC is under control of the VM TCP/IP stack,
            the third VM further configured to determine a status of the virtual switch by determining whether the NIC is active and whether an eligible host route has been stored for the guest VM,
            the third VM further configured to build a host route using the stored eligible host route on behalf of the new guest, and
            the third VM further configured to advertise to the network, via the virtual switch, the host route for the new guest,
            wherein the third VM is launched by the first VM.

2. The system tool of claim 1, further comprising a fourth VM for implementing and maintaining a set of configuration files for the new guest.

3. The system of claim 2, wherein the first VM is based on TCPIP, the second VM is based on MPROUTE, and the fourth VM is based on TCPMAINT.

4. The system of claim 1, wherein new guest includes a predefined virtual internet protocol address.

5. The system of claim 1, wherein the third VM is configured to monitor whether the new guest is coupled to a virtual network interface card (NIC).

6. The system of claim 5, wherein the third VM is configured to determine whether the coupled virtual NIC is controlled by an active stack, and for detecting whether the host route has been built and advertised on behalf of the new guest.

7. A method for relocating an original guest from a first host to a second host in a z/VM environment, the method comprising:
    bringing the original guest down at the first host, wherein the original guest includes a predetermined virtual internet protocol address (VIPA);
    bringing up a new guest at the second host, wherein the new guest has the predetermined VIPA;
    autologging on a first virtual machine (VM) at the second host, wherein the first VM is configured to act as a VM Transmission Control Protocol/Internet Protocol (TCP/IP) stack that provides an interface between the new guest and a virtual switch;

launching a second VM to provide a VM multiprotocol server configured for OSPF (Open Shortest Path First) to run with the VM TCP/IP stack to generate a host route for the new guest, wherein the second VM is launched by the first VM; and launching a third VM configured to monitor whether the new guest is coupled to a virtual network interface card (NIC), and to monitor whether the virtual NIC is under control of the VM TCP/IP stack, the third VM further configured to determine a status of the virtual switch by determining whether the NIC is active and whether an eligible host route to the second host has been stored for the guest VM, the third VM further configured to build a host route using the stored eligible host route on behalf of the new guest, and the third VM further configured to advertise to the network, via the virtual switch, the host route to the second host for the new guest, wherein the third VM is launched by the first VM.

8. The method of claim 7, further comprising launching a fourth VM for implementing and maintaining a set of configuration files for the new guest.

9. The method of claim 8, wherein the first VM is based on TCPIP, the second VM is based on MPROUTE, and the fourth VM is based on TCPMAINT.

10. The method of claim 7, wherein the new guest has a different physical internet protocol address than the original guest.

11. The method of claim 7, wherein the third VM is configured to monitor whether the new guest is coupled to a virtual network interface card (NIC).

12. The method of claim 11, further comprising:

determining, using the third VM, whether the coupled virtual NIC is controlled by an active stack; and referencing, using the third VM, a configuration file to determine whether a host route to the second host has been built and advertised on behalf of the new guest.

13. A computer program product for automating the processing of a new guest at a host in a virtual machine (VM) environment, the computer program product comprising:

a non-transitory computer readable storage medium having computer readable program code embodied therewith, the computer readable program code comprising:

program code for autologging on a first VM at the host, wherein the first VM is configured to act as a VM Transmission Control Protocol/Internet Protocol (TCP/IP) stack that provides an interface between the new guest and a virtual switch;

program code for launching a second VM to provide a VM multiprotocol server configured for OSPF (Open Shortest Path First) to run with the VM TCP/IP stack to generate a host route for the new guest, wherein the second VM is launched by the first VM; and program code for launching a third VM, the third VM configured to monitor whether the new guest is coupled to a virtual network interface card (NIC), and to monitor whether the virtual NIC is under control of the VM TCP/IP stack, the third VM further configured to determine a status of the virtual switch by determining whether the NIC is active and whether an eligible host route has been stored for the guest VM, the third VM further configured to build a host route using the stored eligible host route on behalf of the new guest, and the third VM further configured to advertise to the network, via the virtual switch, the host route for the new guest, wherein the third VM is launched by the first VM.

14. The computer program product of claim 13, wherein the host is configured to run z/VM.

15. The computer program product of claim 14, further comprising program code for launching a fourth VM for implementing and maintaining a set of configuration files for the new guest.

16. The computer program product of claim 15, wherein the first VM is based on TCPIP, the second VM is based on MPROUTE, and the fourth VM is based on TCPMAINT.

17. The computer program product of claim 13, wherein new guest has a predetermined virtual internet protocol address.

18. The computer program product of claim 13, wherein the third VM is configured to monitor whether the new guest is coupled to a virtual network interface card (NIC).

19. The computer program product of claim 18, wherein the third VM is configured to determine whether the coupled virtual NIC is controlled by an active stack, and configured to detect whether a host route has been advertised on behalf of the new guest.

20. The computer program product of claim 13, wherein the first, second and third VMs are configured to run continuously.

\* \* \* \* \*